Patented Feb. 19, 1935

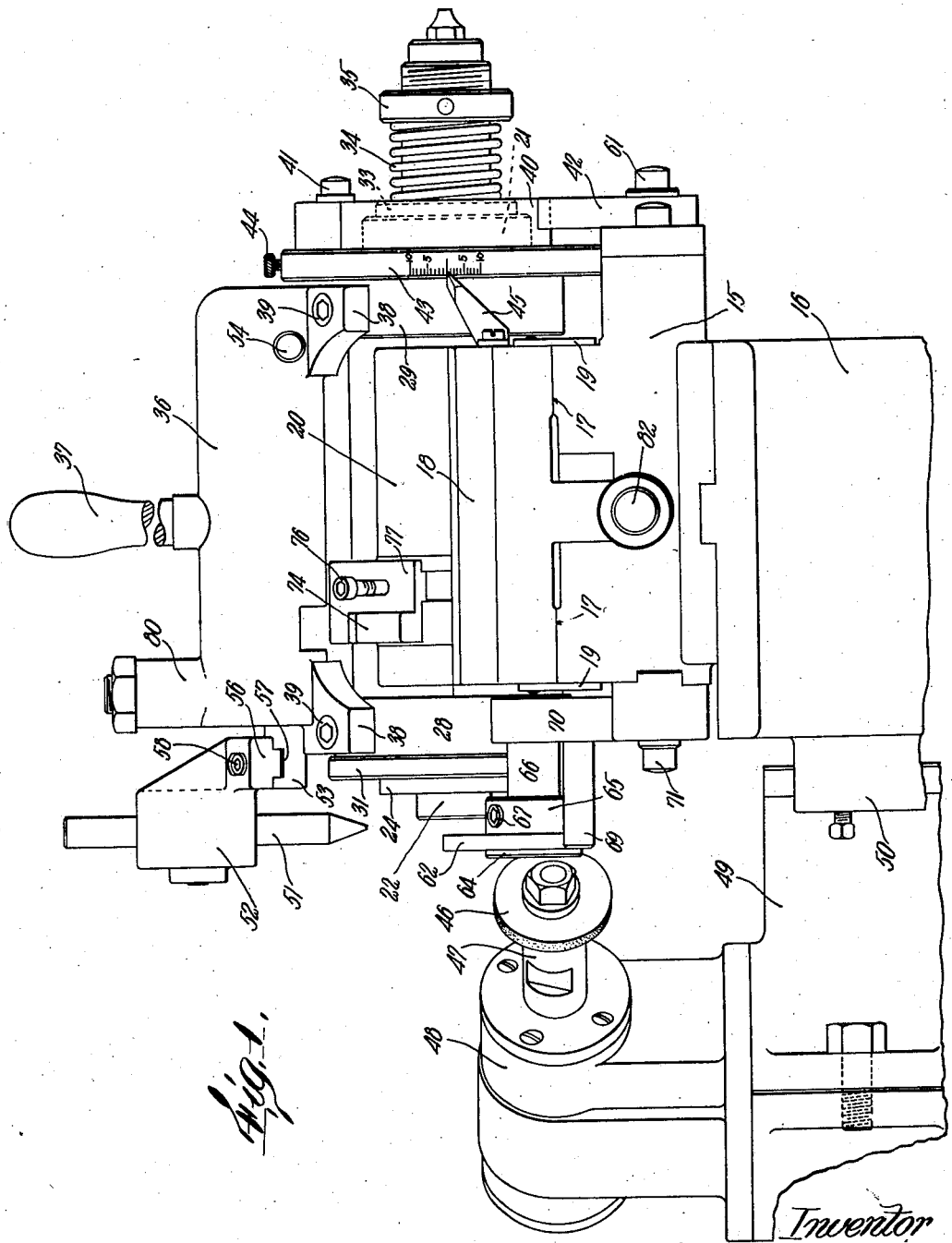

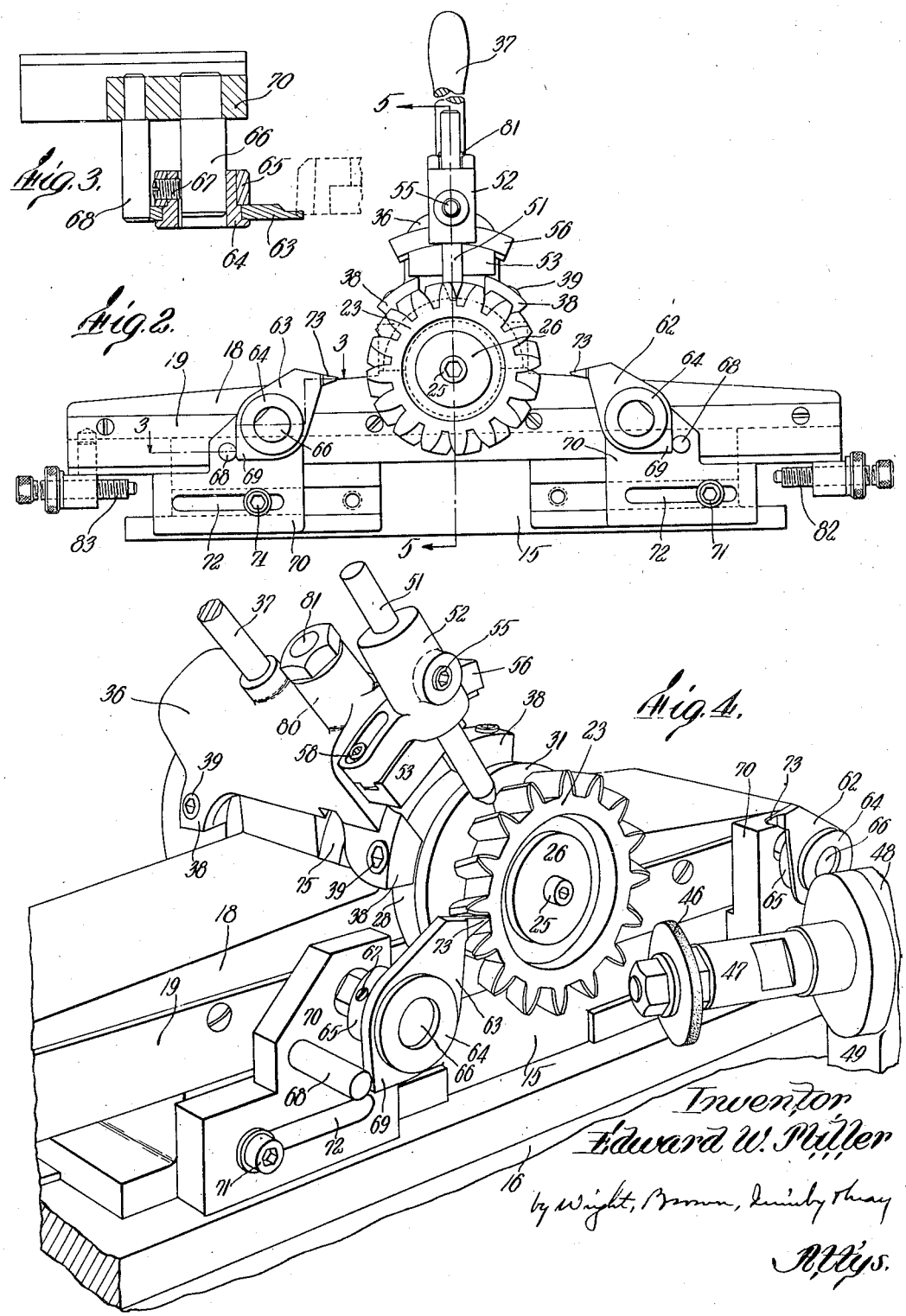

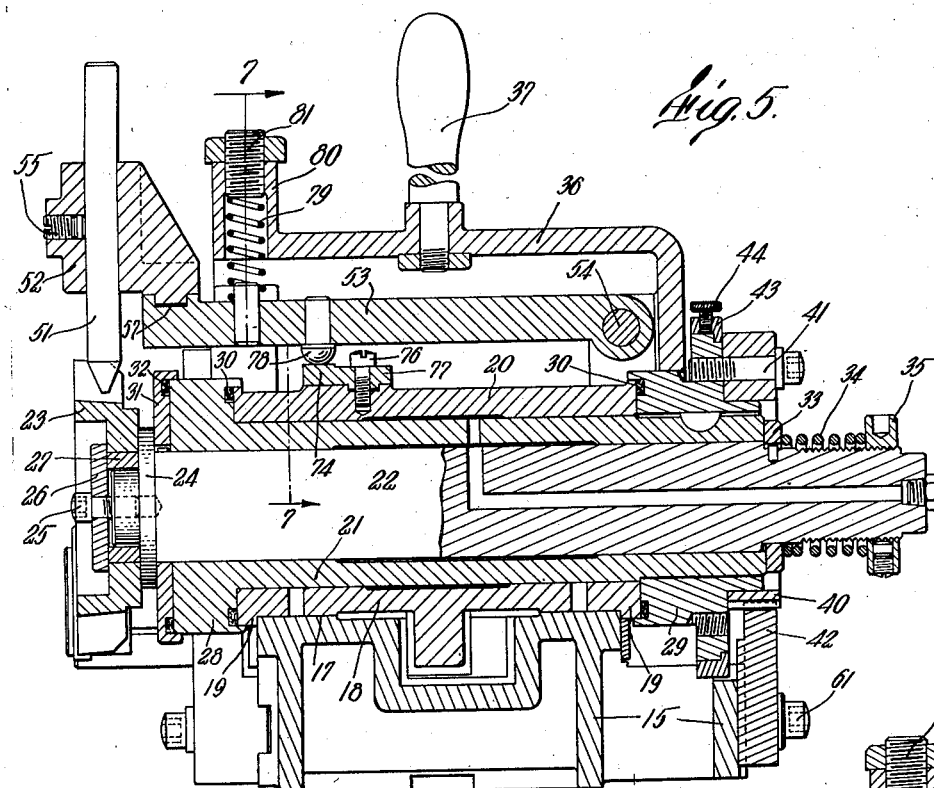

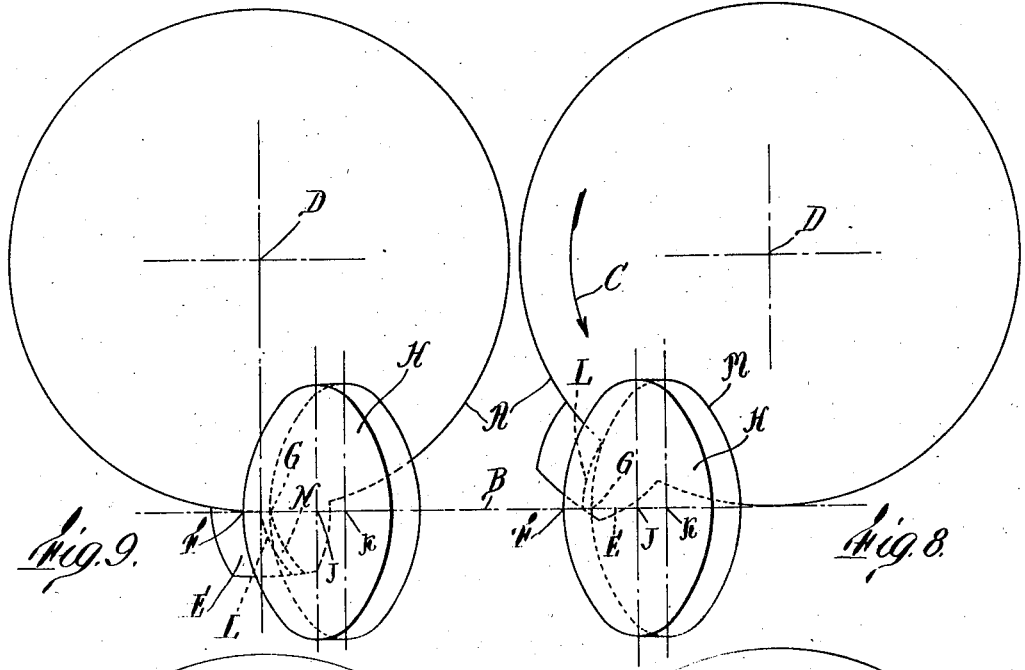
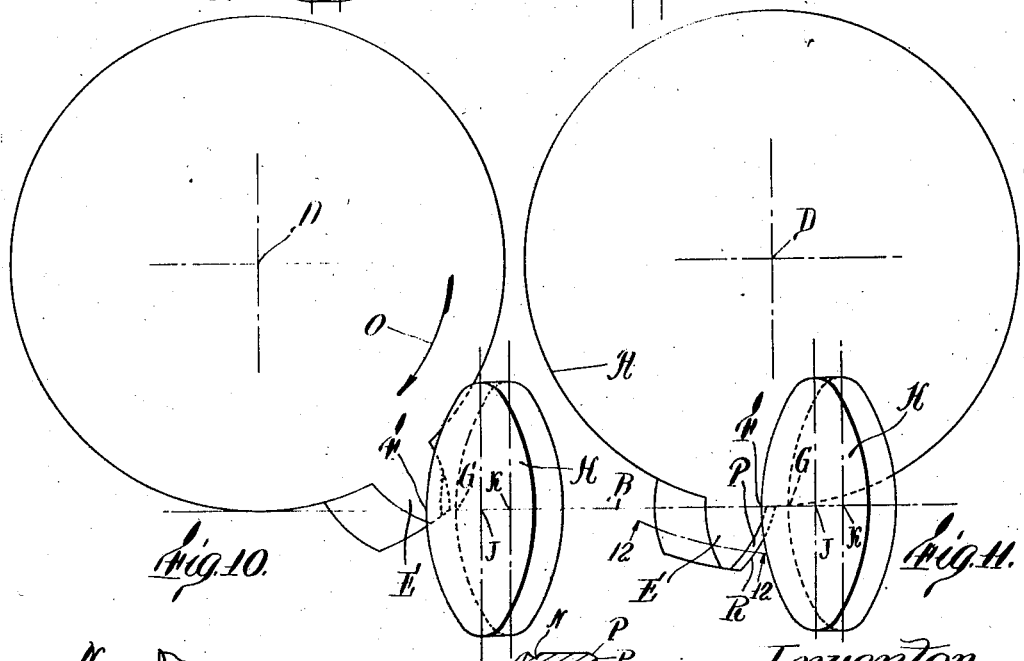
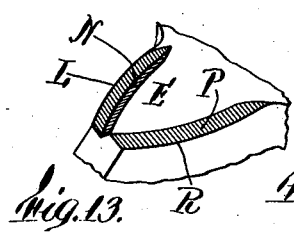

1,991,406

UNITED STATES PATENT OFFICE 1,991,406

CUTTER SHARPENING MACHINE

Edward W. Miller, Springfield, Vt., assignor to
The Fellows Gear Shaper Company, Springfield,
Vt., a corporation of Vermont Application June 13, 1932, Serial No. 616,840

9 Claims. (Cl. 51—95)

The present invention relates to means for sharpening gear shaper cutters, i. e., cutters for generating gears and other machine elements by a cutting action analogous to planing, and of which the teeth are arranged similarly to those of a gear with involute faces and have cutting edges at one end. The object is to sharpen such cutting edges with a top rake at each edge making a given angle, which angle is the same in all planes normal to the edge, with the adjacent side face of the tooth. It is part of my object to produce such a top rake, of any desired angle, at each side of the tooth, whether the teeth are straight, (i. e., parallel to the axis of the cutter in their longitudinal median lines) or helically arranged.

I have accomplished these objects by effecting a relative rolling movement between a spinde or arbor carrying the gear to be sharpened and a grinding wheel which is adjustable conformably to the prescribed angle of top rake. This relative motion generates an involute helicoidal surface intersecting the adjacent side face of a tooth in a plane perpendicular to the axis of the cutter, when the translative component of such rolling motion is perpendicular to the axis of the cutter. The invention comprises generically means for effecting such movements, together with a specific indexing means, and other details of the embodiment shown in the accompanying drawings. These drawings illustrate a specific form of the invention designed as a fixture for use with tool room grinders of types widely used in machine shops for sharpening tools; such grinders being equipped with grinding wheels and provisions for adjusting such wheels translatively and angularly. However, this design is merely one of many in which the essential principles may be embodied, and is not to be taken as limiting my protection to less than that defined by the appended claims.

In the drawings,—

Fig. 1 is a side elevation of the embodiment of the invention chosen for illustration herein;

Fig. 2 is a front elevation of so much of the machine as is contained in a fixture for application to a tool grinding machine and includes means for rolling and indexing the cutter;

Fig. 3 is a detail sectional view taken on line 3—3 of Fig. 2, and enlarged, showing one of the indexing dogs;

Fig. 4 is a perspective view of the fixture shown in Fig. 2 in its relationship to the grinding wheel when in the act of indexing;

Fig. 5 is a cross section on line 5—5 of Fig. 2;

Fig. 6 is a rear elevation of the fixture shown in Fig. 2;

Fig. 7 is a detail sectional view on line 7—7 of Fig. 5;

Figs. 8–11 inclusive are diagrams illustrating the principle according to which the invention operates;

Fig. 12 is a sectional view, taken approximately on line 12—12 of Fig. 11, but shown on a larger scale, of one of the teeth of a helical gear shaper cutter after being sharpened;

Fig. 13 is a fragmentary perspective view of the sharpened end of the same tooth.

Like reference characters designate the same parts wherever they occur in all the figures.

I will first explain the principles according to which the machine operates, with reference to Figs. 8–11, and its results with reference to Fig. 12, before describing the details of the machine. If the circle A is assumed to represent a cylinder rolling without slip on a plane surface B, in the direction of the arrow C, so that the translative component of the rolling motion is perpendicular to the axis D, then any scribing point in the line of intersection of the plane B with a plane surface secured to the cylinder perpendicular to the axis D and overlapping the plane B, will trace an involute curve on such plane when the cylinder is rolled. The rolling cylinder corresponds to the base cylinder, or evolute, of the face curves of the teeth of an involute gear or gear shaper cutter. If now we substitute for the imaginary plane surface referred to, the segment of such a surface which represents the end face of one of the teeth E of the cutter, and substitute for the imaginary scribing point a cutting element F, G, which may be the intersection with the rolling plane B of the surface of a cylindrical grinding wheel H at the side of such wheel nearest the cutter tooth when the axis J, K of the grinding wheel coincides with the rolling plane, then the scribing element will generate a helicoidal involute surface of which the intersection with the side face of the cutter tooth is an involute line L, all points of which are in a plane perpendicular to the axis of the cutter. This is the result desired.

Actually, of course, cutting is commenced by each element of a grinding wheel before reaching the rolling plane, but it is only when that plane is reached that any element cuts to full depth and becomes what for convenience of description may be called a finish-cutting element. In practice all the surface elements of the rapidly rotating grinding wheel become in turn the cutting element F, G, shown in the diagram, whereby as the cutter rolls from the position shown in Fig. 8 to that in Fig. 9 a surface is generated intersecting the side of the tooth along the line L. The surface so generated provides the top rake of the cutter, the angle of which is determined by the angle at which the wheel axis J, K is set with respect to the side of the tooth, and which is the same at all points of the cutting edge in planes normal to the edge. With the arrangement shown in Figs. 8 and 9, the edge M of the grinding wheel cuts a groove, shown at N in Fig. 12, in the end of the helical cutter tooth E at the obtuse angle side of the tooth, (the obtuse angle side being that side which, in the absence of the groove N, would make an obtuse angle with the end face of the tooth). Results, like in kind but differing in degree, are obtained in grinding a top rake in cutters having straight teeth.

For grinding a bevel on the acute angle side of a helical tooth, to produce a top rake with an angle less acute than that between the side and top faces of the tooth on that side, the grinding wheel and cutter are relatively shifted to the position shown in Fig. 10, where the grinding wheel is at the opposite side of the vertical line through the axis D, from that in which it is located in Fig. 8; and the cutter is rolled in the direction of the arrow O on the rolling surface B to the position of Fig. 11. A helicoidal surface P is then generated to intersect the acute angle side of the tooth in a cutting edge R, all points of which are in a plane perpendicular to the axis of the cutter, which may be the same plane, or a parallel plane, to that containing the edge L.

The machine here illustrated for carrying these principles into effect consists of a base 15, adapted to be applied to or mounted on a pedestal or frame 16. Base 15 has a plane supporting surface 17 on which is mounted a slide or carriage 18 having a complemental under surface and equipped with a suitable intermediate guide and adjustable gib of known character to confine its movement to a given direction. Dust guards 19 protect these surfaces from grit. The slide has a central bearing 20, perpendicular to its prescribed path of motion, in which is rotatably mounted a quill 21; and in the quill is a rotatable spindle or arbor 22 for carrying the cutter 23 to be sharpened. This cutter is clamped rigidly against a flange 24 on the spindle by a screw 25 and washer 26, being centered by a ring 27.

The quill has on one end a flange 28 and on the other end a tightly fitted and keyed collar 29 which between them embrace the ends of the bearing 20 and provide end thrust bearings. These are provided with packings 30 to exclude dust. A dust collar 31 is keyed on the spindle between the flange 24 and the adjacent end of the quill, and equipped with a dust excluding packing 32. A ring 33, loosely fitted and keyed to the other end of the spindle is pressed against the rear end of the quill by a spring 34 which reacts against an adjustable nut 35 on the spindle; holding the dust collar 31 against the quill, and causing friction for a purpose later explained.

A bridge casting 36 carrying an operating arm 37 is secured at its opposite ends to the flange 28 and ring 29 by lugs 38 and bolts 39. It serves to turn the quill and spindle about their common axis, and also to move the carriage 18 bodily along the base for giving the cutter the prescribed rolling movement with respect to the grinding wheel.

The linear component of this movement (translation of the slide) is effected by a gear segment 40, connected by bolts 41 to a flange on the rear end of the ring 29, and a rack 42 bolted to the base 15. An index ring 43 is fitted rotatably on the circumference of the flange of ring 29 and clamped thereon by a set screw 44. It has graduations on its exterior which cooperate with an index finger 45 on the slide to measure the angular movement of the quill.

The grinding wheel 46 for sharpening the cutter is carried by a shaft 47 rotatable in a bearing 48 and driven at suitable speed by any suitable means. The bearing 48 holds the shaft 47 in a horizontal plane and is adjustable angularly on a bracket 49 about a perpendicular axis. The bracket in turn is adjustable vertically in guideways 50 on the supporting pedestal or frame 16. The construction shown in the drawings for enabling such adjustments to be made is essentially the same as those found in tool room grinders now commonly used in machine shops and therefore need not be shown in complete detail. It is sufficient for my present purposes to make it understood that the grinding wheel may be adjusted so as (a) to bring its axis into the rolling plane of the cutter being sharpened (the plane B of Figs. 8-11) which may be the same plane as the supporting surface 17, or a plane parallel to it;

(b) to bring it into the positions relative to the spindle 22 shown respectively in Figs. 8 and 9 on the one hand, and Figs. 10 and 11 on the other;

(c) to set the wheel for any desired angle of top rake at either side of the tooth to be sharpened;

(d) to locate the wheel where its active cutting elements will cut to the desired depth and overlap the end of the tooth to a sufficient but not excessive width.

I may remark at this point that I have described the grinding wheel mount and its adjustments in terms of the vertical and horizontal, on the assumption that the supporting surface 17 of the machine base is horizontal, as it is shown to be in these drawings. But in any equivalent machine, whether the corresponding surface is horizontal or otherwise located, the grinding wheel is arranged and adjustable to bring its axis in the same plane as, or a plane parallel to, the surface 17, and is angularly adjustable about an axis perpendicular to this plane.

The cutter holding spindle 22 is rotatable in the quill 21. A rod 51 with a tapered end adapted to enter between and engage any two teeth of the cutter 23 is mounted in a bracket 52 which in turn is mounted on an arm 53 pivoted by a pin 54 to the bridge casting 36. Such rod, bracket and arm together constitute a latch for positioning the cutter, rotating it in unison with the quill 21 when the operating arm 37 is swung about the axis of the spindle, and releasing the cutter to permit indexing. The rod is adjustable radially of the cutter in the bracket 15, wherein it is clamped by a set screw 55, and the bracket is adjustable circumferentially or tangentially of the spindle with respect to the arm, having slotted lugs 56 fitted to a transverse guideway 57 in the widened forward end of arm 53. Bolts 58 pass through the slots in said lugs and are threaded into the arm for clamping the bracket.

It will be apparent from the foregoing description that a cutter secured, positioned and latched to the spindle will be rolled past the grinding wheel when the operating arm is swung from side to side, and the grinding wheel, having been placed to bring its circumference into intersection with the end face of a tooth of the cutter, will generate such surfaces as those shown at N or at P in Fig. 12; provided the linear motion of the slide is in the proper ratio to the angular motion of the spindle and the grinding wheel axis is in the rolling plane of such base cylinder.

It is essential that the displacement of the slide be equal to the length of arc of the base circumference of the cutter subtending any angle through which the spindle is rotated, in order to secure the effect of rolling of the base circumference on a given plane without slip. The absolute value of such displacement varies for cutters of which the teeth are generated to larger or smaller base cylinders; and is obtained, without other change of the machine, by substituting different gear segments for the segment 40 and appropriately adjusting the rack 42 transversely to the supporting surface 17, such rack having slots 60 through which clamp bolts 61 pass into threaded engagement with the base. The same rack is or may be used for all cutters within the range of a given machine, while the segments are respectively cut to mesh with the rack, without backlash, on pitch lines corresponding to the base cylinders of the different cutters. The angle through which the cutter rolls in carrying the entire edge of a tooth from point to root, on either side, past the grinding wheel is much less than a complete rotation, and this fact enables me to use segments of which the teeth are correctly spaced on any pitch circle whether the entire pitch circumference, extended through 360 degrees, gives room for a whole number of teeth or a fractional number. To illustrate this point, let us assume that the rack is cut with a standard 10 pitch cutter, i. e., one having 10 teeth per inch of pitch diameter. The spacing between corresponding points on adjacent teeth of the rack then become .31416". The teeth of any gear which will mesh with the rack must have this spacing on the pitch line. Assuming that a certain cutter has a base circumference of 9.251, the pitch circumference of the segment to be used when this cutter is sharpened must be of equal length in order to give the nonslip rolling motion. The segment is cut accordingly to have teeth conjugate to the rack with a pitch of .31416 on a pitch circumference of 9.251; and although the division of 9.251 by .31416 indicates that the entire gear must have a fractional number of teeth, i. e., 29.447, this is unimportant inasmuch as the segment used is only a fractional part of a gear. Whatever may be the specific spacing and pressure angle of the rack teeth, the same principle holds, and I am thus able to provide gear segments all having the same spacing of teeth on respectively different pitch circles each equal in radius to the base circle of a given cutter to be sharpened. The fact that the same rack may be used in sharpening all cutters within the range of one machine greatly reduces the necessary number of interchangeable parts.

The cutter is automatically indexed after the sharpening of each tooth, when it has been rolled far enough to be entirely clear of the grinding wheel. For thus indexing the cutter, two dogs 62 and 63 are provided, one at the right and the other at the left of the spindle; and either is used exclusively according as the cutter is rolled to the right in clearing the grinding wheel (Fig. 8) or to the left (Figs. 4 and 10). Dog 63 is mounted rotatably on a sleeve 64 (Fig. 3) and confined between a flange on one end of the sleeve and a collar 65 which surrounds the other end of the sleeve. The sleeve 64 is placed on a stud 66 and clamped thereon by a set screw 67 which also secures the collar 65. Stud 66 and a stop pin 68 for a shoulder 69 on the dog both project from a bracket 70 which is clamped to the front side of the base 15, with provision for adjustment longitudinally of the base, by a bolt 71 passing through a slot 72 in the bracket and threaded into the base. A point or protruding finger 73 on the dog enters the space between two of the cutter teeth as the cutter nears the end of its rolling movement to the left, and by obstructing one of the teeth while the spindle continues to rotate (the latch being then disengaged from the cutter) turns the spindle 22 relatively to quill 21 far enough to enable the pointed positioning rod 51 of the latch to engage the next tooth on the following roll toward the grinding wheel and place the cutter correctly for sharpening another tooth. The dog is free to swing backward under pressure of the tooth which engages it when the cutter rolls away from it, while the friction produced by the spring 34 on the spindle prevents the cutter from turning back after it has once been indexed.

Dog 62 and its mounting are identical with the construction just described, except that they are oppositely and symmetrically disposed. The dog not in use may be removed, if desired, by taking out the bolt 71 which holds its mounting in place.

The latch is displaced from the cutter just before the latter engages the indexing dog, by one of two cams 74, 75, (Fig. 7), clamped adjustably to the outside of the stationary bearing 20 by a bolt 76 passing through a slotted lug 77 on the cam (Fig. 5) into the bearing. A stud 78 set into the latch arm 53 engages the cam 74 when the oscillator is swung to the right, and the cam 75 when swung to the left, whereby the positioning rod is raised clear of the cutter just before the latter begins to be relatively turned by one dog or the other. A spring 79 contained in offset 80 of the bridge casting reacts against an abutment 81 and bears on the latch arm 53 with enough force to turn the cutter and position it when the pointed end of the rod enters to any extent between two teeth of the cutter. Although there may be an open space between the two cams 74 and 75, the stud 78 is prevented by the contact of rod 51 with the cutter from dropping into such space.

By virtue of its angular adjustment, the grinding wheel may be set to sharpen either edge of a helical cutter of either right hand or left hand helix, or to sharpen both sides of a straight spur cutter, with any desired angle of top rake. Other adjustments, common in grinding machines, such as a horizontal adjustment of the entire grinding wheel carriage longitudinally and/or transversely of the slide, and axial adjustment of the grinding wheel shaft, may be provided with the grinding wheel of this machine, without necessity of special illustration herein.

Adjustable stop screws, 82, 83 are mounted in lugs at the ends of the slide 18 for limiting the movements of the slide at points conformable to the dimensions of the cutter teeth being ground, in order to assist the operator in gauging the travel sufficient for grinding and indexing, and to avoid unnecessary over-travel.

While I have referred to the sharpening tool throughout the foregoing description as a grinding wheel, I have done so because a wheel of emery or other hard abrasive is the most suitable available type of sharpening tool; but this is not to be construed as indicating a limitation of the invention in respect to the kind of sharpening tool or element which may be employed for the purpose. That is, the invention is concerned with the means for effecting a desired kind of traverse between a cutter to be sharpened and a sharpening agent, rather than with any details of the sharpening agent itself. Hence within the scope in which I claim protection any sharpening agent, tool or means, already known or which may be developed hereafter, may be used in the combination set forth in substitution for the specific grinding wheel shown. Neither is it essential that the sharpening tool, when a grinding wheel or the like, be cylindrical; for it may be conical, or of other contour, provided only that its finish-cutting elements (previously defined), which need not be straight lines, be normal, or nearly so, to the edge of the cutter tooth in course of sharpening.

What I claim and desire to secure by Letters Patent is:

1. In a machine of the character described in which compound movements of translation and rotation are given to the cutter to be sharpened, means for making such movements equivalent to those of a cutter rolling upon its base circumference along a rolling plane, for different cutters having base circles of respectively different diameters, comprising a rack and a gear segment interchangeable with other gear segments, each of such segments having teeth conjugate to the same rack and the several segments being constructed to make full mesh with said rack, without backlash, on pitch arcs of which the radii are equal respectively to the base circle radii of different cutters.

2. A machine for generating curves on the teeth of gear shaper cutters and the like comprising a spindle on which the work piece is secured, a quill in which said spindle is rotatably mounted, means for imparting rotary and translative movements simultaneously to the quill in such manner as in effect to roll the work piece on its base circle circumference on a rolling plane, a cutting tool in such relation to the work piece as to remove stock from a desired portion of a tooth of the work piece when the latter is thus rolled, a latch connected to the quill and releasably engaged with the work piece for compelling rotation of the work piece with the quill, and means for disengaging the latch from the work piece as the quill approaches one limit of its rotation, whereby the work piece is indexed when rolled out of engagement with the cutting tool.

3. In a machine for generating and cutting surfaces of involute curvature on the teeth of a gear-like article by movements of such an article compounded of translation and rotation thereof relatively to a suitable cutting tool, means for making such movements equivalent to those of an involute gear rolling upon its base circumference along a rolling plane, for different articles having base circles of respectively different diameters, comprising a rack fixed to the machine, and a gear segment adapted to be connected with such article and being interchangeable with other gear segments for meshing engagement with said rack; each of such segments having teeth conjugate to the same rack and the segments being constructed to make full mesh with said rack, without backlash, on pitch arcs of which the radii are equal respectively to the base circle radii of different articles to be generated.

4. In a machine for generating and cutting curves on the teeth of gear-like articles by movements of such articles compounded of translation and rotation thereof relatively to a suitable cutting tool, means for making such movements equivalent to those of a gear rolling upon its base circumference along a controlling surface, for different articles having base circles of relatively different diameters, comprising a gear element fixed to the machine in a given relationship to such control surface, and a gear segment adapted to be connected with the article on which such generating action is performed and to be interchangeable with other similar gear segments; each of such segments having teeth conjugate to the said first named gear element and the several segments being constructed to make full mesh with said element, without backlash, on pitch arcs of which the radii are equal respectively to the base circle radii of different articles.

5. A sharpening machine of the character described comprising a carriage, a base on which the carriage is movable bodily, a quill rotatably mounted in the carriage, means for rotating the quill and simultaneously moving the carriage, a spindle for holding the cutter to be ground mounted rotatably in the quill, a latch connected to the quill and releasably engaging the cutter on said spindle for transmitting the movement of the quill thereto, means on the carriage for releasing the latch when the quill approaches a limit of its rotational movement, and means for turning the cutter to index it when the latch is so released.

6. A cutter sharpening machine comprising a carriage, a base on which said carriage is movable bodily, a quill rotatably mounted in the carriage, a cutter carrying spindle rotatably mounted in the quill, a gear segment secured to the quill, a rack secured to the base meshing with said segment whereby rotation of the quill causes translation of the carriage, a latch connected to the quill and having a projection arranged to enter between teeth of the cutter for positioning the latter and transmitting to it the rotary movements of the quill, a cam element fixed to the carriage for disengaging the latch from the cutter at a prescribed point in the rotary movement thereof, and a dog on the base organized to engage and arrest the cutter during the last part of the rolling movement of the quill, whereby to index the cutter.

7. A cutter sharpening machine comprising a base having guiding means; a carriage engaged with said guiding means and movable reciprocatively thereon, said carriage having a bearing transverse to the path of such reciprocation, a quill rotatably held in said bearing and having end thrust members at opposite ends of the bearing, a bridge structure secured to said end thrust members extending past the bearing outside thereof, complemental gear elements secured to the base and quill respectively arranged to cause displacement of the carriage bodily consequent to rotary movement of the quill, and a spindle rotatably mounted in the quill adapted to carry on its protruding end a gear shaper cutter to be sharpened.

8. A cutter sharpening machine as set forth in claim 7, comprising further a latch carried by said bridge member with provision for movement toward and away from the axis of the spindle and having a portion arranged to engage teeth of the cutter mounted on the spindle to prevent rotation thereof relatively to the quill, yielding means pressing said latch toward the quill axis, a cam secured to said bearing, positioned and constructed to displace said latch and withdraw the tooth engaging portion thereof from the cutter in the course of the rotational movement of the bridge member, and a dog mounted on the base in position to engage a tooth of the cutter after the latch has been so displaced, so as to arrest the rotational movement thereof while the bridge and quill continue in rotation.

9. A cutter sharpening machine comprising a base, a carriage movable bodily on said base, holding means for a cutter to be sharpened mounted on the carriage with provision for rotation relatively thereto, a sharpening instrument arranged to act on the end face of a tooth of a gear shaper cutter carried by said cutter holding means, means for effecting simultaneous rotation of said cutter holding means and translation of said carriage to cause rolling of the cutter tooth past the sharpening instrument, a latch carried by the cutter holding means engaging the cutter to compel rotation thereof with said holding means, a latch displacer organized to cause withdrawal of the latch from the cutter during a portion of such rolling movement, and a dog mounted on the base in position to engage and arrest a tooth of the cutter during a further portion of the rolling movement of the cutter holder while the latch is withdrawn from the cutter.

EDWARD W. MILLER.